United States Patent [19]
Cho

[11] Patent Number: 5,929,938
[45] Date of Patent: Jul. 27, 1999

[54] MOTION ADAPTIVE LUMINANCE AND CHROMINANCE SIGNAL SEPARATING CIRCUIT

[75] Inventor: Hyun-Duk Cho, Kyeongki-Do, Rep. of Korea

[73] Assignee: Daewoo Electronics Co., Ltd., Seoul, Rep. of Korea

[21] Appl. No.: 08/829,600

[22] Filed: Mar. 31, 1997

[30] Foreign Application Priority Data

Oct. 29, 1996 [KR] Rep. of Korea ....................... 96-49818

[51] Int. Cl.[6] ....................................................... H04N 9/78
[52] U.S. Cl. .......................... 348/665; 348/667; 348/669; 348/670
[58] Field of Search ..................................... 348/663, 665, 348/667, 668, 669, 670; H04N 9/78

[56] References Cited

U.S. PATENT DOCUMENTS

| 4,851,904 | 7/1989 | Miyazaki et al. | 358/105 |
| 5,146,318 | 9/1992 | Ishizuka | 348/663 |
| 5,225,899 | 7/1993 | Park | 358/31 |
| 5,345,276 | 9/1994 | Hong | 348/663 |

FOREIGN PATENT DOCUMENTS

| 0 360 380 | 3/1990 | European Pat. Off. . |
| 2 240 687 | 8/1991 | United Kingdom . |

OTHER PUBLICATIONS

Patent Abstracts of Japan, vol. 014, No. 414 (E–0975), Sep. 7, 1990 & JP 02 159808A (Fujitsu Ltd), Jun. 20, 1990.
Patent Abstracts of Japan, vol. 018, No. 060 (E–1499), Jan. 31, 1994 & JP 05 276531 A (NEC Corp), Oct. 22, 1993.

*Primary Examiner*—Sherrie Hsia
*Attorney, Agent, or Firm*—Pillsbury Madison & Sutro LLP

[57] ABSTRACT

A circuit for separating composite video signals into luminance and chrominance signals in response to motion of a displayed image. A motion detecting section detects motion of an image to be displayed on a television screen according to input composite video signals in order to generate motion sensing signals corresponding to motion of the image. A first comb-filtering section adaptively comb-filters input composite video signals in a vertical direction according correlation among three continuous horizontal scanning lines to separate input composite video signals into first comb-filtered chrominance signals and first comb-filtered luminance signals. A second comb-filtering section adaptively comb-filters input composite video signals in the time direction in response to a correlation between frames in order to separate the input composite video signals into the second comb-filtered chrominance signals and the second comb-filtered luminance signals. A mixing section mixes the first comb-filtered chrominance signals with the second comb-filtered chrominance signals in order to generate motion adaptive chrominance signals, and the first comb-filtered luminance signals with the second comb-filtered luminance signals in order to generate motion adaptive luminance signals, in response to the motion sensing signal. Therefore, the circuit can separate composite video signals into luminance signals and chrominance signals without generating the hanging dot and dot crawl phenomena.

25 Claims, 7 Drawing Sheets

MOTION ADAPTIVE LUMINANCE AND CHROMINANCE SIGNAL SEPARATING CIRCUIT

BACKGROUND OF THE INVENTION

1. Field of the Invention

The present invention relates to a circuit for separating a composite video signal into a chrominance signal and a luminance signal in a color television system. More particularly, the present invention relates to a motion adaptive luminance and chrominance signal separating circuit which separates a composite video signal into a chrominance signal and a luminance signal by adaptively comb-filtering the composite video signal in response to a motion degree of an image displayed in a television receiver.

2. Description of the Prior Art

It is generally known that the human eye distinguish chrominance data such as hue, saturation, etc., with great detail, unlike luminance data. Thus, most television video signal assign a wide band (4.2 MHz in the NTSC system) to luminance data. In contrast, the resolution for hue and saturation only requires a 1/10 to 1/3 bandwidth of brightness.

According to the aforementioned characteristic, the chrominance signals have a much narrower bandwidth than the luminance signals. For instance, in the NTSC system. an I signal component of the chrominance signal has a band of 1.3 MHz, and a Q component has a band of 0.5MHz, respectively.

In the NTSC system, relative to the frequency of the carrier of the complete video signal the color subcarrier is at about 3.58 MHz, the luminance signal extends to 4.2 MHz. the Q component of the modulated chrominance signal extends 0.5 MHz to each side of the subcarrier, and the sidebands of the I component of the modulated chrominance signal extend from 1.5 MHz below to 0.6 MHz above the subcarrier. The subcarrier wave itself is suppressed in the transmitted video signal.

Formation of the transmitted video signal from the original RGB signals from a video camera is referred to encoding, and recovery of the RGB signals from the received video signal at the receiver is referred to decoding. The decoding includes an operation of separating a received composite video signal into a chrominance signal and a luminance signal, which has most commonly been effected by comb-filtering.

FIG. 1 is a block diagram for showing a conventional comb-filter.

In FIG. 1, the circuit includes an input terminal 11, a 1 H (a period of horizontal synchronizing signal; hereinafter, referred to as H)-delaying circuit 12, a first subtracter 13, a ½-amplifier 14, a band pass filter (hereinafter, referred to as "BPF") 15, and a second subtracter 16.

In the circuit as shown in FIG. 1, when a composite video signal is inputted to the 1 H-delaying circuit 12 which has passed through the input terminal 11, the 1 H-delaying circuit 12 delays the composite video signal for one horizontal scanning period and outputs the 1 H-delayed composite video signal to the first subtracter 13. The first subtracter 13 subtracts the 1 H-delayed composite video signal from a currently composite video signal to generate a subtracted signal, and outputs the subtracted signal which has a component of a chrominance signal to the ½-amplifier 14. Then, the ½-amplifier 14 ½-amplifies the subtracted signal from the first subtracter 13 to generate a ½-amplified signal, and outputs the ½-amplified signal to the BPF 15.

The BPF 15 filters the ½-amplified signal from ½-amplifier 14 to generate a filtered signal, and outputs the filtered signal as a chrominance signal C to an exterior. The second subtracter 16 subtracts the chrominance signal C from the currently composite video signal to generate a luminance signal Y, and outputs the luminance signal Y to the exterior.

Therefore, in the comb-filter 10, as the 1 H-delayed composite video signal is subtracted from a currently composite signal on the basis of the fact that chrominance signals between two horizontal lines have the phase difference of 180°, a luminance signal is removed from a composite video signal which is inputted through the input terminal 11, so that a chrominance signal is continuously obtained.

But, the comb-filter 10 has problems, such as a hanging dot phenomenon and a dot crawl phenomenon in a screen of television receiver. The hanging dot phenomenon is generated when chrominance signals are transient into the vertical direction, and the dot crawl phenomenon is generated when chrominance signals and luminance signals are mixed while being passed through a band pass filter.

For removing the problems such as the hanging dot and dot crawl phenomena, several methods have been presented. A correlation adaptive comb-filtering method is one of the methods.

FIG. 2 is a block diagram of a conventional correlation adaptive comb-filter.

In FIG. 2, the correlation adaptive comb-filter 20 includes an input terminal 21, a first 1H-delaying circuit 22, a second 1H-delaying circuit 23, a first subtracter 24, a second subtracter 25, a first ½-amplifier 26, a second ½-amplifier 27, a first LPF 28, a second LPF 29, a comparator 30, and a data selector 31.

In the correlation adaptive comb-filter 20, the first 1 H-delaying circuit 22 delays a composite video signal passed through the input terminal 21 for a horizontal line scanning time to generate a 1 H-delayed signal, and outputs the 1 H-delayed signal to the second 1 H-delaying circuit 23, the first subtracter 24, and the second subtracter 25, respectively. The second 1 H-delaying circuit 23 delays the 1 H delayed signal from the first 1 H-delaying circuit 22 for the horizontal line scanning time to generate a 2 H-delayed signal, and outputs the 2 H-delayed signal to the second adder 25. The first subtracter 24 subtracts a currently composite video signal through the input terminal 21 from the 1 H-delayed signal to generate a first subtracted signal 33, and outputs the first subtracted signal 33 to the first ½-amplifier 26 and the first LPF 28. Also, the second subtracter 25 subtracts the 2 H-delayed signal from the 1 H-delayed signal to generate a second subtracted signal 34, and outputs the second subtracted signal 34 to the second ½-amplifier 27 and the second LPF 29, respectively. Each of the first and second ½-amplifier 26 and 27 ½-amplifies the first subtracted signal 33 and the second subtracted signal 34, and outputs the signals ½-amplified by each of them to a first input terminal A and a second input terminal B of the data selector 31, respectively.

Each of the first LPF 28 and the second LPF 29 filters the first subtracted signal 33 and the second subtracted signal 34, and outputs a first filtered signal 35 and a second filtered signal 36, which are generated by respectively filtering the first subtracted signal 33 and the second subtracted signal 34, to a first input terminal A and a second input terminal B of the comparator 30. The comparator 30 compares the first filtered signal 35 with the second filtered signal 36, thereby generating a control signal according to a result of the comparison, and provides the control signal to a control signal input terminal S of the data selector 31 so that the data selector 31 may selectively output one of the signals ½-amplified by each of the first ½-amplifier 26 and the second ½-amplifiers 27 as a chrominance signal C.

For example, when an amplitude of the first filtered signal 35 is higher than an amplitude of the second filtered signal 36, the comparator 30 generates a high logic signal as the control signal, and provides the high logic signal to the data selector 31. Then, the data selector 31 selects the first subtracted signal 33 ½-amplified by the first ½-amplifier 26, and outputs the selected signal as the chrominance signal C to an exterior. On the contrary, when the amplitude of the first subtracted signal is lower than the amplitude of the second subtracted signal, the comparator 30 generate a low logic signal as the control signal, and provides the low logic signal to the data selector 31. Then, the data selector 31 selects the second subtracted signal 34 ½-amplified by the second ½-amplifier 27, and outputs the selected signal as the chrominance signal C to the exterior.

Further, the chrominance signal C from the data selector 31 is filtered by a BPF, such as in FIG. 1, and the filtered chrominance signal is subtracted from a composite video signal, thereby obtaining a luminance signal.

Therefore, according to the comb-filter 20, defaults which are displayed on a screen of TV, such as the hanging dot and dot crawl phenomena, can be prevented by respectively separating a composite video signal into a chrominance and luminance signal in response to the degrees of correlation between composite video signals of three horizontal scanning lines.

However, when a degree of the correlation between scanning lines is low, the comb-filter 20 of FIG. 2 still causes the hanging dot and dot crawl phenomena because the comb-filter 20 only separates a composite video signal into a chrominance and a luminance signal according to a degree of the correlation between three horizontal scanning lines.

U.S. Pat. No. 5,225,899 (issued to Young-June Park on Jul. 6, 1993) discloses one example of a circuit for separating a composite video signal into a luminance and a chrominance signal according to the correlation of the image to be displayed in TV. The circuit disclosed in U.S. Pat. No. 5,225,899 includes a line comb-filtering circuit for comb-filtering the input composite video signal, a line comb-filter for detecting each vertical correlation from the comb-data outputted from the line comb-filtering circuit and selecting one of the comb-data according to the detected vertical correlation, a horizontal band pass filter circuit for inversely and reinversely delaying the video signal supplied from the line comb-filter and producing the chrominance signal data and the vertical correlation data from the video signals, a horizontal correlation adaptive circuit for detecting a horizontal correlation from the horizontal correlation data and selecting one of the chrominance signal data according to the detected horizontal correlation, and a luminance and chrominance signal output portion for receiving the video signal and chrominance signal supplied from the line comb-filtering circuit and a horizontal correlation adaptive circuit, respectively, to output the finally separated luminance signal and chrominance signal. The circuit prevents the hanging dot and dot crawl phenomena, thereby improving the image quality.

However, in the circuit, when the correlation of vertical and horizontal direction is small, and an image displayed on the TV screen is still, the hanging dot and the dot crawl phenomena are still generated on the TV screen.

For the foregoing reasons, there is a need for a circuit that can remove the hanging dot and dot crawl phenomena.

SUMMARY OF THE INVENTION

It is an object of the present invention to provide a motion adaptive chrominance signal and luminance signal separating circuit that can separate a composite video signal into a luminance signal and a chrominance signal without generating the hanging dot and dot crawl phenomena.

In order to achieve the above-mentioned object of the present invention, there is provided a motion adaptive chrominance signal and luminance signal separating circuit, the motion adaptive chrominance signal and luminance signal separating circuit comprising:

a motion detecting means for detecting a motion of an image which is to be displayed on a television screen according to inputted composite video signals in order to generate motion sensing signals corresponding to a degree of the motion of the image;

a comb-filtering means for adaptively comb-filtering the inputted composite video signals in a vertical direction in order to generate first comb-filtered chrominance signals and first comb-filtered luminance signals, and in a time direction in order to generate second comb-filtered chrominance signals and second comb-filtered luminance signals; and a mixing means for mixing the first comb-filtered chrominance signals with the second comb-filtered chrominance signals in order to generate motion adaptive chrominance signals, and the first comb-filtered luminance signals with the second comb-filtered luminance signals in order to generate motion adaptive luminance signals, in response to the motion sensing signal from the motion detecting means.

According to the present invention, the motion adaptive chrominance signal and luminance signal separating circuit can separate a composite video signal into a luminance signal and a chrominance signal without generating the hanging dot and dot crawl phenomena.

BRIEF DESCRIPTION OF THE DRAWINGS

The above object and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the circuitry configuration and the operation of circuitry according to one embodiment of the present invention.

Figure 1:
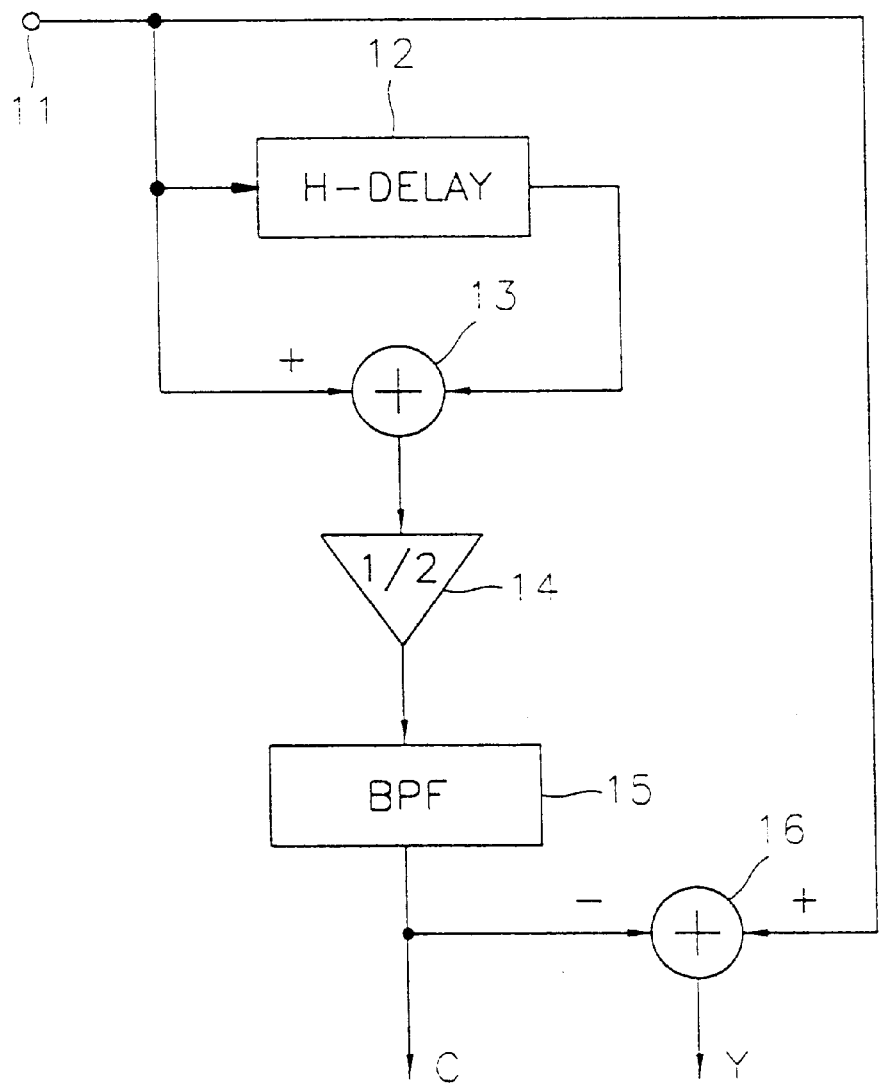
FIG. 1 is a block diagram of a conventional comb-filter.
Figure 2:
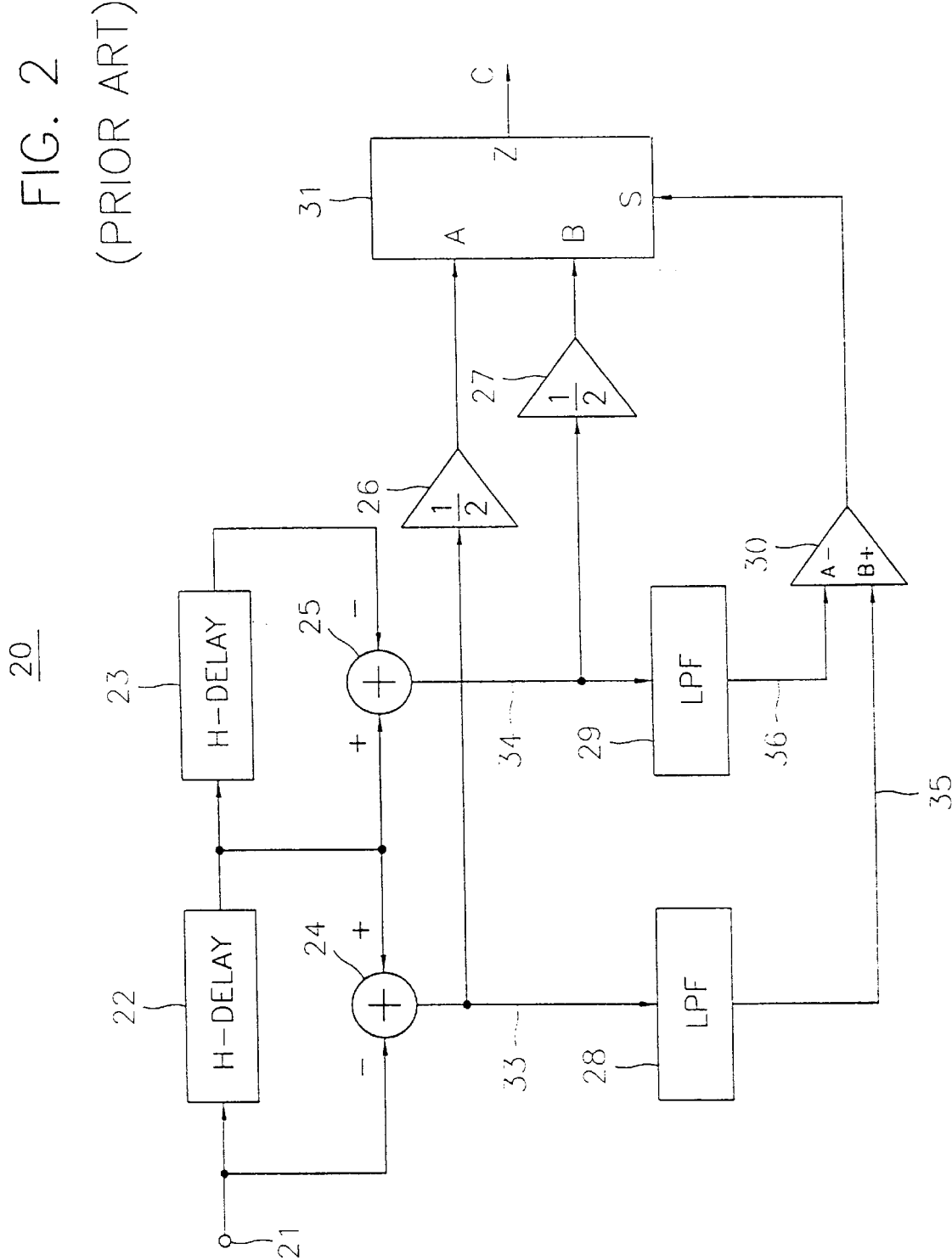
FIG. 2 is a block diagram of a conventional correlation adaptive comb-filter.
Figure 3:
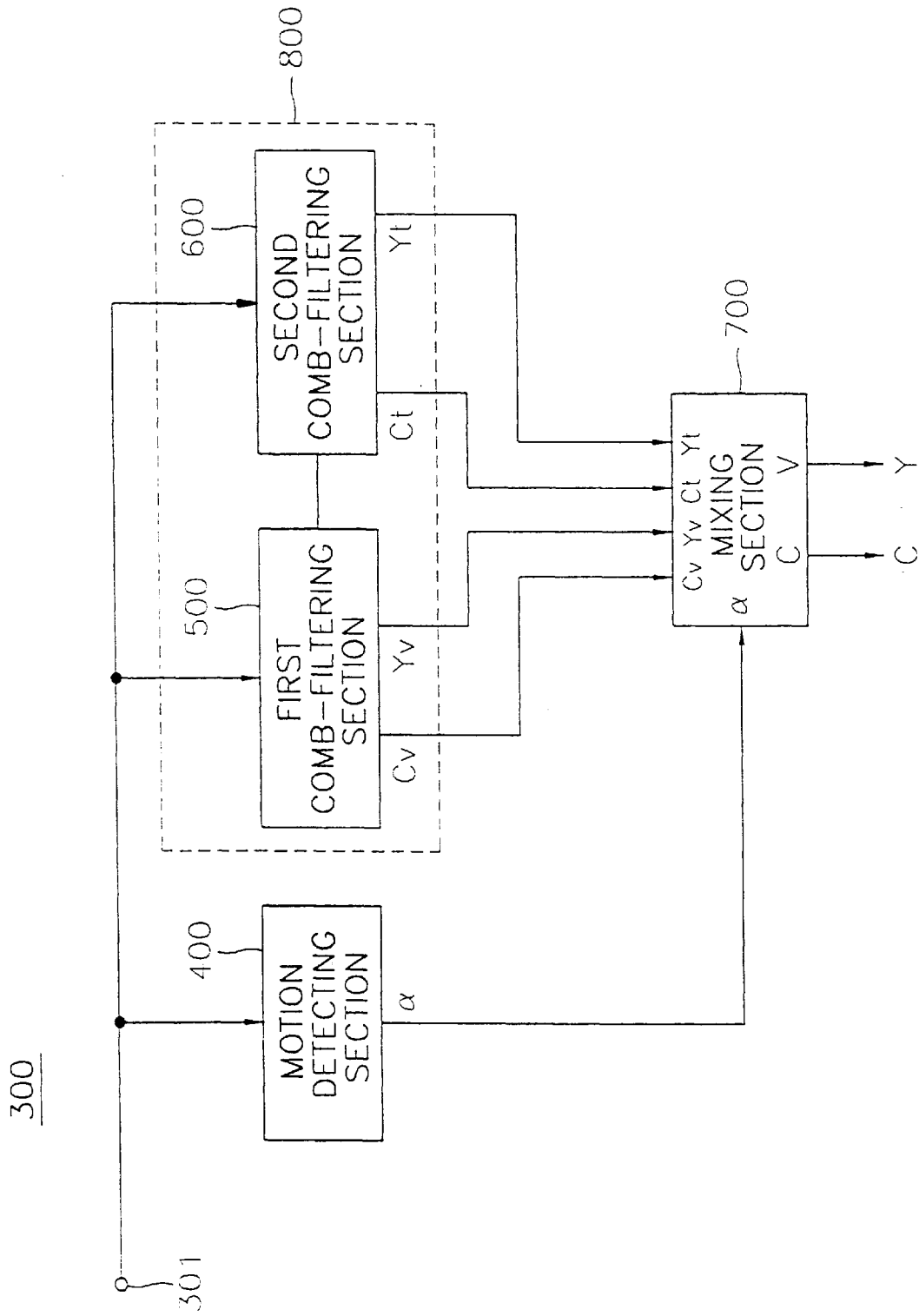
FIG. 3 is a block diagram of a motion adaptive luminance and chrominance signal separating circuit according to one embodiment of the present invention.

FIG. 3 is a block diagram of a motion adaptive luminance and chrominance signal separating circuit 300 according to one embodiment of the invention.

In FIG. 3, the motion adaptive chrominance and luminance signal separating circuit includes a motion detecting section 400, a comb-filtering section 800, and a mixing section 700.

The motion detecting section 400 senses a difference in an image information between frames of composite video signals inputted through an input terminal 301, develops a motion sensing signal (α) corresponding to the difference of the image information between the frames, and provides the motion sensing signal (α) to the mixing section 700.

Figure 4:
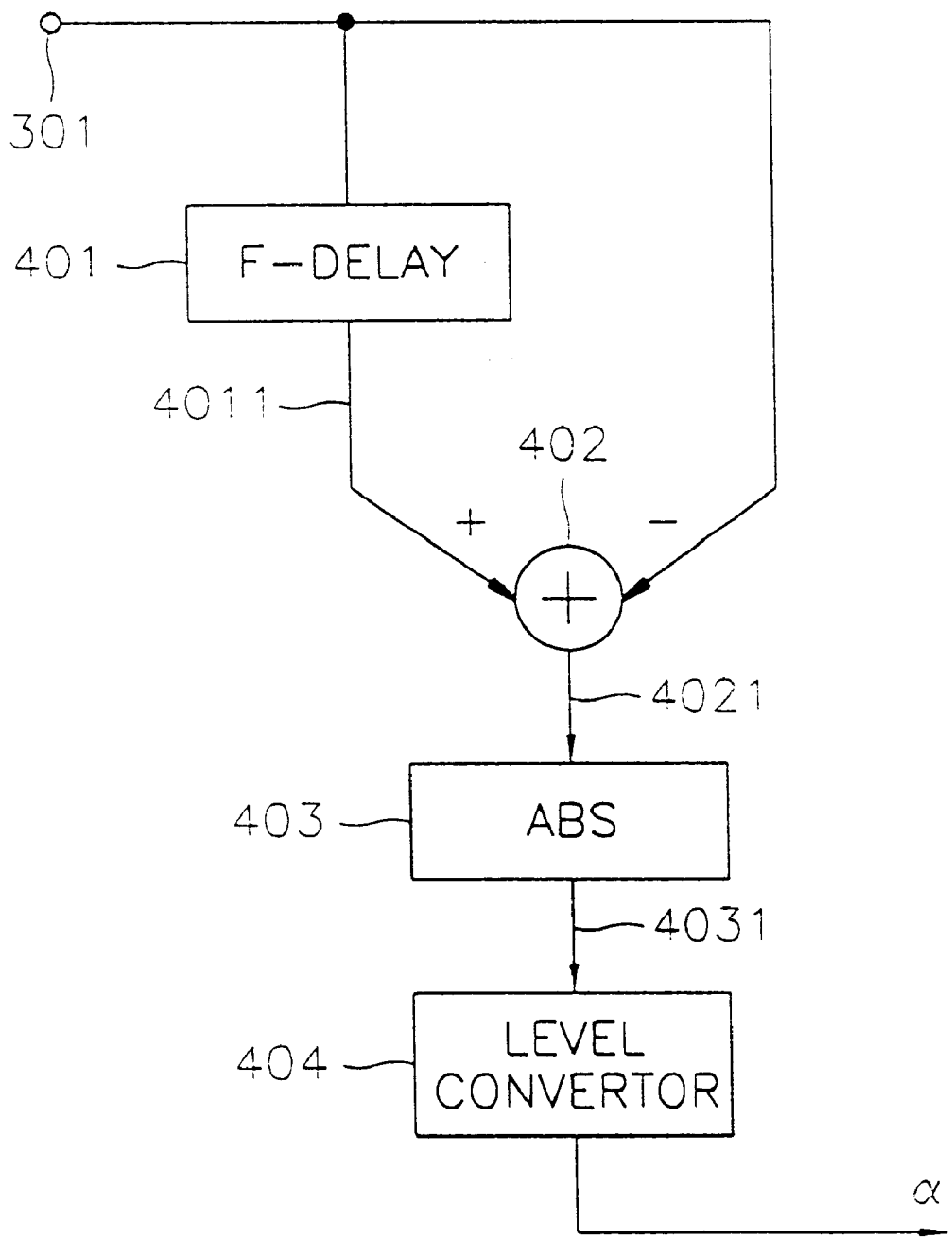
FIG. 4 is a block diagram for showing one example of a motion detecting section depicted in FIG. 3.

FIG. 4 is a block diagram of one example of a motion detecting section 400 depicted in FIG. 3.

In FIG. 4, the motion detecting section 400 includes a first frame-delaying section 401, a first subtracter 402, an absolute value circuit 403 (hereinafter, referred to as "ABS"), and a level convertor 404.

The first frame-delaying section 401 delays a composite video signal through the input terminal 301 for a frame scanning time to develop a frame-delayed signal, and outputs a frame-delayed signal 4011 to the first subtracter 402. The first subtracter 402 subtracts a currently composite video signal inputted through the input terminal 301 from the frame-delayed signal 4011 provided from the first frame-delaying section 401 so that the first subtracter 402 generates a first subtracted signal 4021. The ABS 403 makes the first subtracted signal 4021 from the first subtracter 402 absolute to generate an absolute signal 4031, and outputs the absolute signal 4031 to the level convertor 404. Then, the level convertor 404 develops the motion sensing signal (α) corresponding to the absolute signal 4031 from the ABS 403, and provides the motion sensing signal (α) to the mixing section 700. Preferably, the motion sensing signal (α) has a value from 0 through 1.

Referring to FIG. 3, again, the comb-filtering section 800 develops a first comb-filtered chrominance signal Cv and a first comb-filtered luminance signal Yv in response to degrees of correlations between three continuous horizontal scanning lines, and develops a second comb-filtered chrominance signal Ct and a second comb-filtered luminance signal Yt in response to a degree of correlation between two continuous frames.

The comb-filtering section 800 preferably includes a first comb-filtering section 500 for developing the first comb-filtered chrominance signal Cv and the first comb-filtered luminance signal Yv, and a second comb-filtering section 600 for developing the second comb-filtered chrominance signal Ct and the second comb-filtered luminance signal Yt.

The first comb-filtering section 500 separates a composite video signal through the input terminal 301 into the first comb-filtered chrominance signal Cv and the first comb-filtered luminance signal Yv in response to the degrees of the correlations between 3-continuous horizontal scanning lines, and provides the first comb-filtered chrominance signal Cv and the first comb-filtered luminance signal Yv to the mixing section 700.

Figure 5:
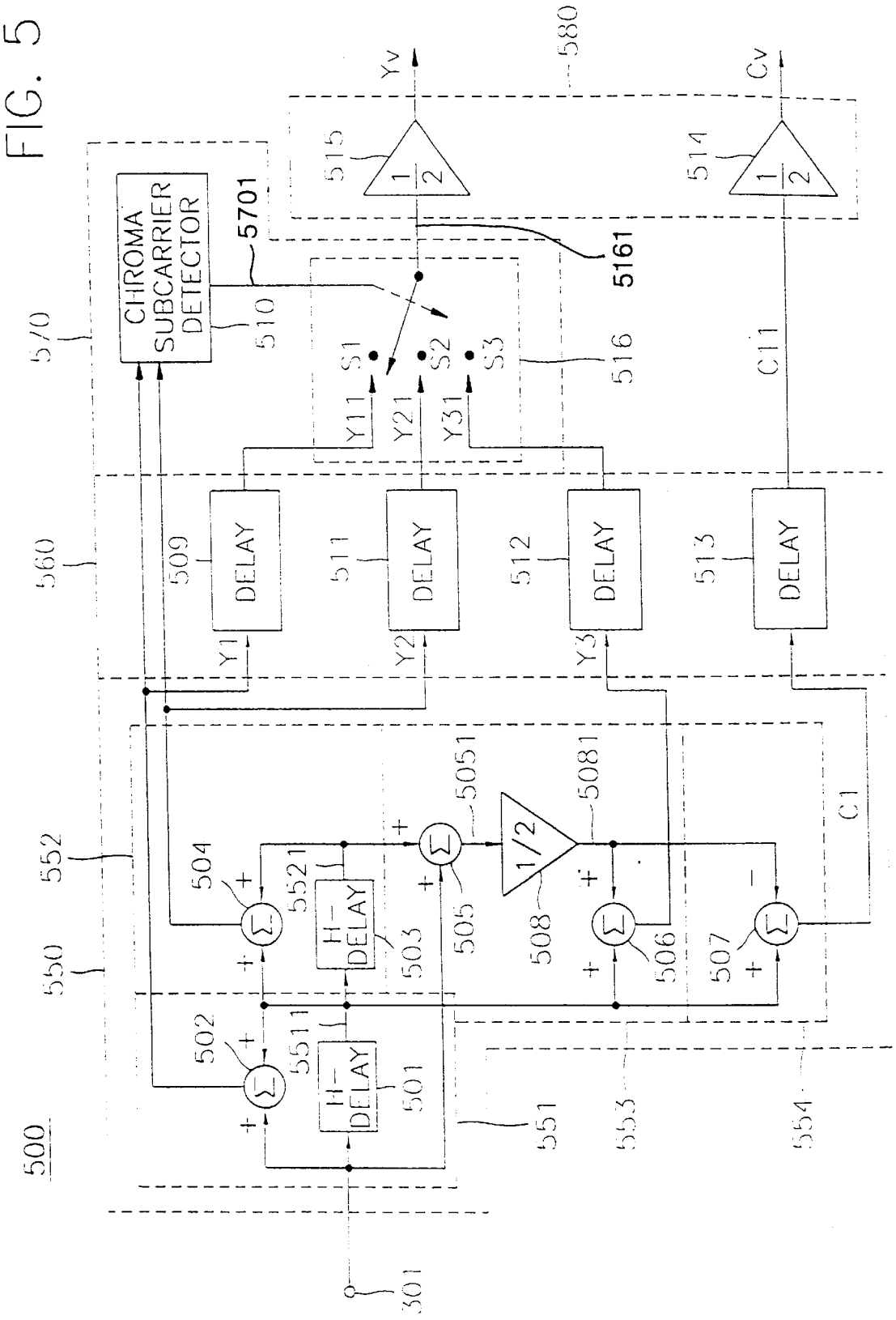
FIG. 5 is a block diagram for showing one example of a first comb-filtering section.

FIG. 5 is a block diagram for showing one example of the first comb-filtering section 500. The first comb-filtering section 500 will be described below in detail with reference to FIG. 5.

In FIG. 5, the first comb-filtering section 500 preferably includes a line comb-filter 550, a first synchronizing section 560, a selecting section 570, and a first ½-amplifying section 580.

The line comb-filter 550 develops a first luminance signal Y1, a second luminance signal Y2, a third luminance signal Y3, and a first chrominance signal C1 from a composite video signal inputted through the input terminal 301.

The first synchronizing section 560 synchronizes the first luminance signal Y1, the second luminance signal Y2, the third luminance signal Y3, and the first chrominance signal C1 from the line comb-filter 550 at a predetermined time.

The selecting section 570 selects one of the first luminance signal Y1, the second luminance signal Y2, and the third luminance signal Y3 according to whether or not a chrominance subcarrier is detected in the two luminance signals, and outputs a selected signal 5161 to the first ½-amplifying section 580.

The first ½-amplifying section 580 ½-amplifies the first chrominance signal C1 from the first synchronizing section 560 and the selected signal 5161 from the selecting section 570, and generates a first ½-amplified signal and a second ½-amplified signal. Also, the first ½-amplifying section 580 provides the first ½-amplified signal and the second ½-amplified signal as the first comb-filtered luminance signal Yv and the first comb-filtered chrominance signal Cv to the mixing section 700.

The line comb-filter 550 preferably includes a first luminance signal generating section 551 for generating the first luminance signal Y1, a second luminance signal generating section 552 for generating the second luminance signal Y2, a third luminance signal generating section 553 for generating the third luminance signal Y3, and a first chrominance signal generating section 554 for generating the first chrominance signal C1.

The first luminance signal generating section 551 preferably includes a first 1 H-delaying section 501 and a first adder 502. The second luminance signal generating section 552 preferably includes a second 1 H-delaying section 503 and a second adder 504. The third luminance signal generating section 553 preferably includes a third adder 505, a fourth adder 506, and a first ½-amplifier 508. Also, the first chrominance signal generating section 554 preferably is a second subtracter 507.

The first 1 H-delaying section 501 of the first luminance signal generating section 551 delays a composite video signal through the input terminal 301 for one horizontal scanning time to develop a 1 H-delayed signal 5511, and provides the 1 H-delayed signal 5511 to the first adder 502, the second 1 H-delaying section 503, the second adder 504, the fourth adder 506, and the second subtracter 507, respectively. The first adder 502 adds the 1 H-delayed signal 5511 from the first 1 H-delaying section 501 to a composite video signal which is currently being inputted through the input terminal 301 in order to generate a first added signal Y1, and provides the first added signal Y1 as the first luminance signal Y1 to the first synchronizing section 560 and the selecting section 570, respectively.

The second 1 H-delaying section 503 of the second luminance signal generating section 552 delays the first 1 H-delayed signal 5511 from the first 1 H-delaying section 501 to develop a 2 H-delayed signal 5521, and provides the 2 H-delayed signal 5521 to the second adder 504 and the third adder 505, respectively. The second adder 504 adds the 2 H-delayed signal 5521 to the 1 H-delayed signal 5511 to generate a second added signal Y2, and provides the second added signal as the second luminance signal Y2 to the first synchronizing section 560 and the selecting section 570, respectively.

The third adder 505 of the third luminance signal generating section 553 adds the 2 H-delayed signal 5521 from the second 1H-delaying section 503 to a currently composite video signal being inputted through the input terminal 301 to generate a third added signal 5051, and provides the third added signal 5051 to the first ½-amplifier 508. The ½-amplifier 508 ½-amplifies the third added signal 5051 to generate a first ½-amplified signal 5081, and outputs the first ½-amplified signal 5081 to the fourth adder 506 and the second subtracter 507, respectively. The fourth adder 506 adds the 1 H-delayed signal 5511 from the first 1 H-delaying section 501 to the first ½-amplified signal 5081 to generate a fourth added signal Y3, and provides the fourth added signal Y3 as the third luminance signal Y3 to the first synchronizing section 560.

The second subtracter 507 of the first chrominance signal generating section 554 subtracts the first ½-amplified signal 5081 from the 1 H-delayed signal 5511 to generate a second subtracted signal C1, and outputs the second subtracted signal C1 to the first synchronizing section 560.

The first synchronizing section 560 preferably includes a first delaying section 509, a second delaying section 511, a third delaying section 512, and a fourth delaying section 513.

The first delaying section 509 delays the first luminance signal Y1 to synchronize the first luminance signal Y1 at the predetermined time, and outputs a first synchronized signal Y11 to the selecting section 570. The second delaying section 511 delays the second luminance signal Y2 to synchronize the second luminance signal Y2 at the predetermined time, and output a second synchronized signal Y21 to the selecting section 570. The third delaying section 512 delays the third luminance signal Y3 to synchronize the third luminance signal Y3 at the predetermined time, and outputs the third synchronized signal Y31 to the selecting section 570. The fourth delaying section delays the first chrominance signal C1 to synchronize the first chrominance signal C1 at the predetermined time, and outputs the fourth synchronized signal C11 to the first ½-amplifying section 580.

The selecting section 570 preferably includes a switch 516 and a color subcarrier detector 510 for selecting one of the first, second and third synchronized signals Y11, Y21, and Y31.

The switch 516 includes three input terminals S1, S2, and S3 each of which is connected to the first, second, and third delaying sections 509, 511, and 512 to selectively output one of the first, second, and third synchronized signals Y11, Y21, and Y31 inputted through each of the three input terminals S1, S2, and S3 in response to a switch controlling signal 5701 provided from the color subscriber detector 510.

The color subcarrier detector 510 generates the switch controlling signal 5701 on the basis of the first luminance Y1 signal and the second luminance signal Y2, and provides the switch controlling signal 5701 to the switch 516 to be controlled. That is, when the color subcarrier detector 510 detects a subcarrier signal in the first luminance signal Y1, the color subcarrier detector 510 generates a first signal as the switch controlling signal 5701 corresponding to the detection result of the subcarrier signal, and provides the first signal to the switch 516. Then, the switch 516 switches on the second input terminal S2 thereof, thereby outputting the second synchronized signal Y21 as the selected signal 5161 to the first ½-amplifying section 580. When the color subcarrier detector 510 detects the subcarrier signal in the second luminance signal Y2, color subcarrier detector 510 generates a second signal as the switch controlling signal 5701 corresponding to the detection result of the subcarrier signal, and provides the second signal to the switch 516. Then, the switch 516 outputs the first luminance signal Y11 as the selected signal 5161 to the first ½-amplifying section. Also, in contrast to the aforementioned two cases, whether or not the color subcarrier detector 510 detects the subcarrier signal in both the first and second luminance signal Y1 and Y2, the color subcarrier detector 510 generates a third signal as the switch controlling signal 5701 corresponding to the detecting result, and provides the third signal to the switch 516. Then, the switch 516 outputs the third synchronized signal Y31 as the selected signal 5161 to the first ½-amplifying section 580.

The first ½-amplifying section 580 preferably includes a second ½-amplifier 514 and a third ½-amplifier 515.

The second ½-amplifier 514 ½-amplifies the fourth synchronized signal from the fourth delaying section 513 to generate a second ½-amplified signal, and outputs the second ½-amplified signal as the first comb-filtered chrominance signal Cv of the first comb-filtering section 500 to the mixing section 700.

The third ½-amplifier 515 ½-amplifies the selected signal 5161 from the switch 516 to generate a third ½-amplified signal, and outputs the third ½-amplified signal as the first comb-filtered luminance signal Yv to the mixing section 700.

Figure 6:
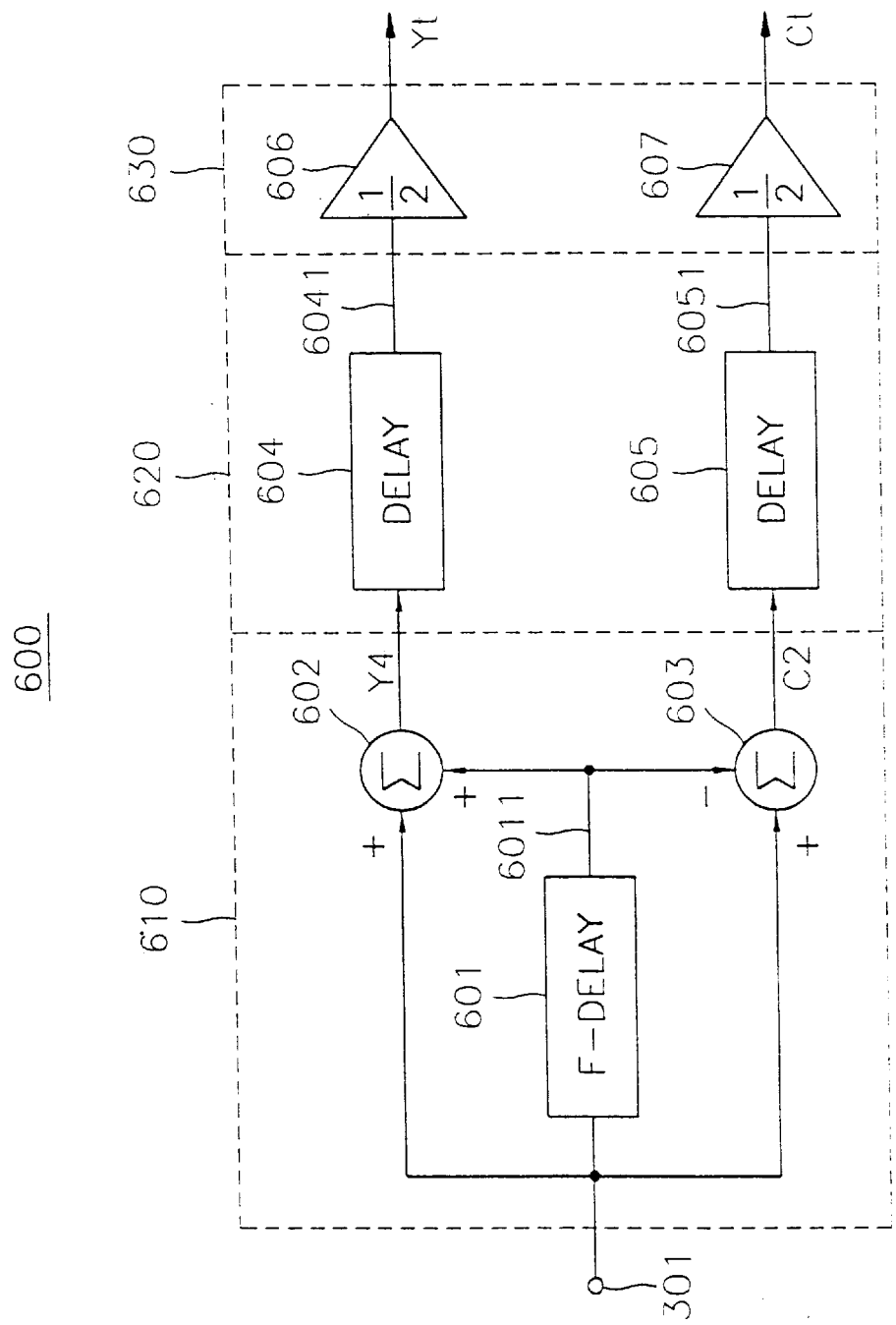
FIG. 6 is a block diagram for showing one example of a second comb-filtering section depicted in FIG. 3.

FIG. 6 is a block diagram for showing one example of a second comb-filtering section 600 depicted in FIG. 3.

In FIG. 6, the second comb-filtering section 600 includes a frame comb-filter 610, a second synchronizing section 620, and a second ½-amplifying section 630.

The frame comb-filter 610 generates a fourth luminance signal Y4 and a second chrominance signal C2. The frame comb-filter 610 preferably includes a second frame delaying section 601, a fifth adder 602, and a third subtracter 603. The second frame delaying section 601 delays a composite video signal through the input terminal 301 to develop a second frame-delayed signal 6011, and respectively provides the second frame-delayed signal 6011 to the fifth adder 602 and the third subtracter 603. The fifth adder 602 adds the second frame-delayed signal 6011 to a currently composite video signal inputted through the input terminal 301 so that the fifth adder 602 may generate the fourth luminance signal Y4, and outputs the fourth luminance signal Y4 to the second synchronizing section 620. Also, the third subtracter 603 subtracts the second frame-delayed signal 6011 from the currently composite video signal to generate a second chrominance signal C2, and outputs the second chrominance signal C2 to the second synchronizing section 620.

The second synchronizing section 620 synchronizes both the forth luminance signal Y4 and the second chrominance signal C2 at the predetermined time. The second synchronizing section 620 preferably includes a fifth delaying section 604 and a sixth delaying section 605 for synchronizing the fourth luminance signal Y4 and the second chrominance signal C2 at the predetermined time. The fifth delaying section 604 delays the forth luminance signal Y4 to be synchronized at the predetermined time, and outputs a fifth synchronized signal 6041 to the second ½-amplifying section 630. The sixth delaying section 605 delays the second chrominance signal C2 to be synchronized at the predetermined time, and outputs a sixth synchronized signal 6051 to the second ½-amplifying section 630.

The second ½-amplifying section 630 ½-amplifies the fifth synchronized signal 6041 and the sixth synchronized signal 6051 to respectively generate the second comb-filtered luminance Yt and the second chrominance signal Ct, and outputs the second comb-filtered luminance Yt and the second chrominance signal Ct to the mixing section 700.

The second ½-amplifying section 630 preferably includes a fourth ½-amplifier 606 and a fifth ½-amplifier 607 for respectively ½-amplifying the fifth synchronized signal 6041 and the second chrominance signal 6051. The fourth ½-amplifier 606 ½-amplifies the fifth synchronized signal 6041 to generate the second comb-filtered luminance Yt. The fifth ½-amplifier 607 ½-amplifies the sixth synchronized signal 6051 to generate the second comb-filtered chrominance signal Ct.

Figure 7:
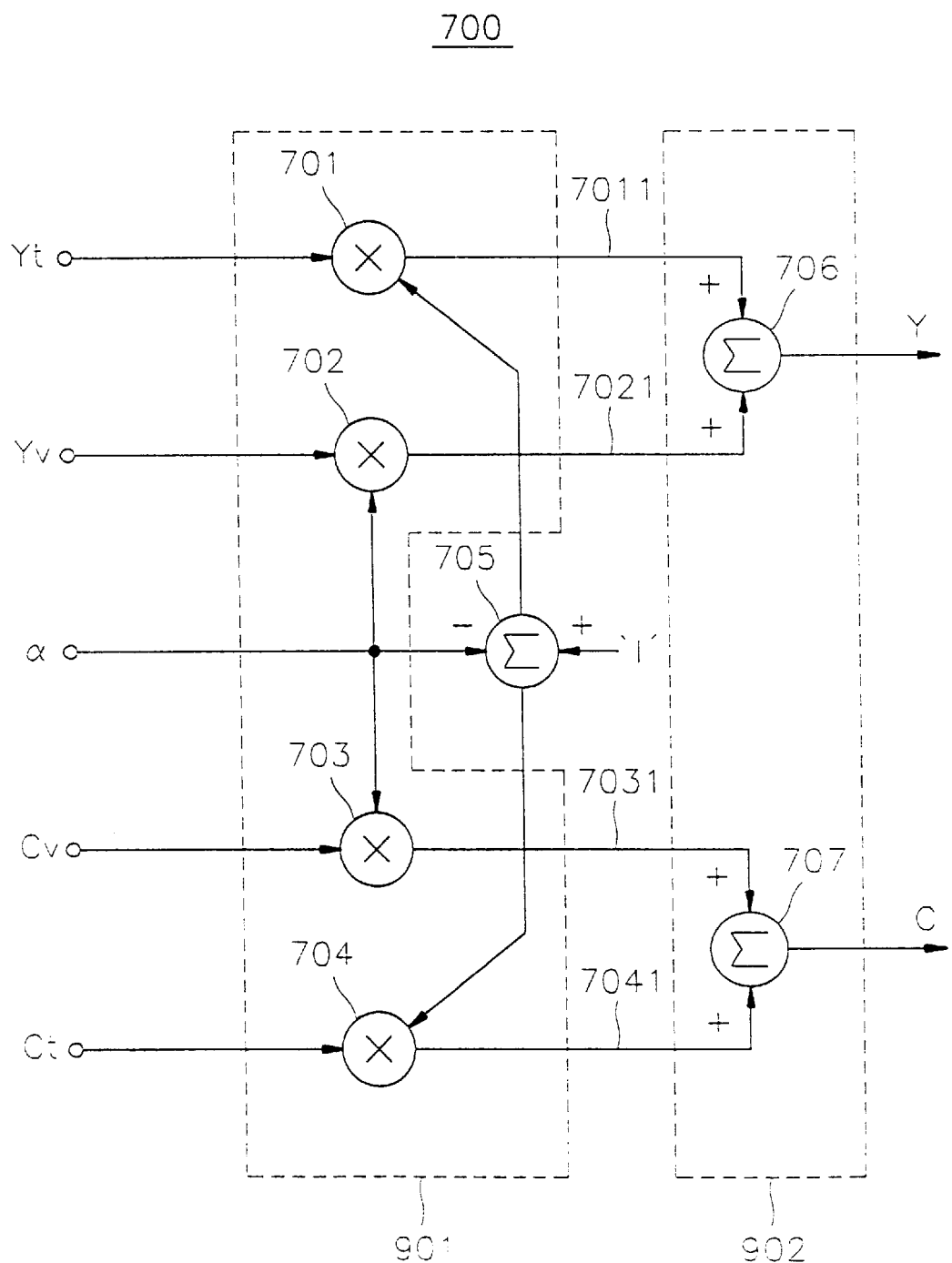
FIG. 7 is block diagram for showing one example of a mixing section depicted in FIG. 3.

FIG. 7 is block diagram for showing one example of a mixing section 700 depicted in FIG. 3.

As shown in FIG. 7, the mixing section 700 preferably includes a fourth subtracter 705, a multiplying section 901, and an adding section 902 for developing the motion adaptive chrominance signal C and the motion adaptive luminance signal Y in response to the motion sensing signal ($\alpha$).

The fourth subtracter 705 subtracts the motion sensing signal ($\alpha$) from the motion detecting section 400 from a unit signal of '1' to generate a fourth subtracted signal (1–$\alpha$), and provides the fourth subtracted signal (1–$\alpha$) to the multiplying section 901.

The multiplying section 901 preferably includes a first multiplier 701, a second multiplier 702, a third multiplier 703, and a fourth multiplier 704.

The first multiplier 701 multiplies the second comb-filtered luminance signal Yt by the fourth subtracted signal (1–$\alpha$) to generate a first multiplied signal 7011, and outputs the first multiplied signal 7011 to the adding section 902.

The second multiplier 702 multiplies the first comb-filtered luminance signal Yv by the motion sensing signal ($\alpha$) to generate a second multiplied signal 7021, and outputs the second multiplied signal 7021 to the adding section 902.

The third multiplier 703 multiplies the first comb-filtered chrominance signal Cv by the motion sensing signal ($\alpha$) to generate a third multiplied signal 7031, and outputs the third multiplied signal 7031 to the adding section 902.

The fourth multiplier 704 multiplies the second comb-filtered chrominance signal Ct by the fourth subtracted signal (1–$\alpha$) to generate a fourth multiplied signal 7041, and outputs the fourth multiplied signal 7041 to the adding section 902.

The adding section 902 preferably includes a sixth adder 706 and a seventh adder 707.

The sixth adder 706 adds the first multiplied signal 7011 to the second multiplied signal 7021 to generate the motion adaptive luminance signal Y.

The seventh adder 707 adds the third multiplied signal 7031 to the fourth multiplied signal 7041 to generate the motion adaptive chrominance signal C.

Therefore, in separating a composite video signal into a luminance signal and a chrominance signal, the motion adaptive luminance and chrominance signal separating circuit according to the present invention develops a motion adaptive luminance signal by mixing a first comb-filtered luminance signal, which is generated by adaptively comb-filtering the composite video signal according to the correlation between horizontal scanning lines, with a second comb-filtered luminance signal, which is generated by adaptively comb-filtering the composite video signal according to the correlation between frames, and develops a motion adaptive chrominance signal by mixing a first comb-filtered chrominance signal, which is generated by adaptively comb-filtering the composite video signal according to the correlation between horizontal scanning lines, with a second comb-filtered chrominance signal which is generated by adaptively comb-filtering the composite video signal according to the correlation between frames, in response to a motion sensing signal, so that the circuit separates the composite video signal into a luminance signal and a chrominance signal without displaying the hanging dot and dot crawl phenomena on the TV screen.

As described previously the present invention has an advantage that it can separate a composite video signal into a luminance signal and a chrominance signal without generating the hanging dot and dot crawl phenomena.

The invention may be embodied in other specific forms without departing from the spirit or essential characteristics thereof. The present embodiments are therefore to be considered in all respects as illustrative and not respective, the scope of the invention being indicated by the appended claims rather than by the foregoing description and all changes which come within the meaning and range of equivalency of the claims are therefore intended to be embraced therein.

What is claimed is:

1. A circuit for separating a composite video signal into a chrominance signal and a luminance signal, said circuit comprising:

a motion detecting means for detecting a motion of an image which is to be displayed on a television screen according to inputted composite video signals in order to generate motion sensing signals corresponding to a degree of the motion of the image;

a comb-filtering means including a first comb-filtering section for adaptively comb-filtering the input composite video signals in a vertical direction according to degrees of correlations between three continuous horizontal scanning lines in order to separate the inputted composite video signals into first comb-filtered chrominance signals and first comb-filtered luminance signals; and a second comb-filtering section for adaptively comb-filtering the inputted composite video signals in a time direction according to a correlation between frames in order to separate the input composite video signals into second comb-filtered chrominance signals and second comb-filtered luminance signals, wherein said first comb-filtering section includes a line comb-filter for comb-filtering the input composite video signals, 1 H-delayed signals which delay the input composite video signals by one horizontal scanning period, and 2 H-delayed signals which delay the input composite video signals by two horizontal scanning period in order to generate first luminance signals, second luminance signals, third luminance signals, and first chrominance signals, respectively; a first synchronizing section for synchronizing the first luminance signals, the second luminance signals, the third luminance signals, and the first chrominance signals to a predetermined time in order to generate first synchronized signals, second synchronized signals, third synchronized signals, fourth synchronized signals, respectively; a selecting section for selecting one of the first synchronized signals, the second synchronized signals, and the third synchronized signals on a basis of the first and second luminance signals in order to generate the selected signals; and a first ½-amplifying section for ½-amplifying the selected signals in order to generate the first comb-filtered luminance signals, and the fourth synchronized signals in order to generate the first comb-filtered chrominance signals; and a mixing means for mixing the first comb-filtered chrominance signals with the second comb-filtered chrominance signals in order to generate motion adaptive chrominance signals, and the first comb-filtered luminance signals with the second comb-filtered luminance signals in order to generate motion adaptive luminance signals, in response to the motion sensing signals from the motion detecting means.

2. A circuit as recited in claim 1, wherein said first comb-filtered chrominance signals are generated by adaptively comb-filtering the inputted composite video signals according to vertical correlations between three horizontal scanning lines. and said second comb-filtered chrominance signals are generated by adaptively comb-filtering the input composite video signals according to a correlation between frames.

3. A circuit as recited in claim 1, wherein said first comb-filtered luminance signals are generated by adaptively comb-filtering the input composite video signals according to vertical correlations between three horizontal scanning lines, and said second comb-filtered luminance signals are generated by adaptively comb-filtering the input composite video signals according to a correlation between frames.

4. A circuit as recited in claim 1, wherein said line comb-filter includes a first luminance signal generating section for delaying the input composite signals by one horizontal scanning period in order to generate the 1 H-delayed signals, and adding the 1 H-delayed signals to the input composite video signals in order to generate the first luminance signals;

a second luminance signal generating section for delaying the input composite signals by two horizontal scanning periods in order to generate the 2 H-delayed signals, and adding the 2 H-delayed signals to the 1 H-delayed signals in order to generate the second luminance signals;

a third luminance signal generating section for adding the input composite video signals to the 2 H-delayed signals in order to generate added signals, ½-amplifying the added signals in order to generate first ½-amplified signals, and adding the 1 H-delayed signals to the first ½-amplified signals to generate the third luminance signals; and a first chrominance signal generating section for subtracting the first ½-amplified signals from the 1 H-delayed signals in order to generate the first chrominance signals.

5. A circuit as recited in claim 4, wherein said first luminance signal generating section includes a 1 H-delaying section for delaying the input composite signals by one horizontal scanning period in order to generate the 1 H-delayed signals; and an adder for adding the 1 H-delayed signals to the input composite video signals in order to generate the first luminance signals.

6. A circuit as recited in claim 4, wherein said second luminance signal generating section includes a 1 H-delaying section for delaying the 1 H-delayed signals by one horizontal scanning period in order to generate the 2 H-delayed signals; and an adder for adding the 2 H-delayed signals to the 1 H-delayed signals in order to generate the second luminance signals.

7. A circuit as recited in claim 4, wherein said third luminance signal generating section includes a first adder for adding the input composite video signals to the 2 H-delayed signals in order to generate the added signals;

an ½-amplifier for ½-amplifying the added signals in order to generate the first ½-amplified signals; and a second adder for adding the 1 H-delayed signals to the first ½-amplified signals to generate the third luminance signals.

8. A circuit as recited in claim 4, wherein said first chrominance signal generating section includes a first subtracter for subtracting the first ½-amplified signals from the 1 H-delayed signals in order to generate the first chrominance signals.

9. A circuit as recited in claim 1, wherein said first synchronizing section includes a first delaying section for delaying the first luminance signals by the predetermined time in order to generate the first synchronized signals;

a second delaying section for delaying the second luminance signals by the predetermined time in order to generate the second synchronized signals;

a third delaying section for delaying the third luminance signals by the predetermined time in order to generate the third synchronized signals; and a fourth delaying section for delaying the first chrominance signals by the predetermined time in order to generate the fourth synchronized signals.

10. A circuit as recited in claim 1, wherein said selecting section includes a switch for selecting one of the first luminance signals, the second luminance signals, and the third luminance signals from the first synchronizing section according to a switch control signal in order to develop the selected signals; and a subcarrier detector for detecting color subcarriers from the first luminance signals and the second luminance signals in order to generate the switch control signal according to a detection result and provide the switch control signal to the switch.

11. A circuit as recited in claim 10, wherein said subcarrier detector generates a first control signal as the switch control signal when detecting the color subcarriers from the second luminance signals, a second control signal, as the switch control signal when detecting the color subcarriers from the first luminance signals, and a third control signal as the switch control signal when detecting both the first and second luminance signals or not, thereby said switch selects the first luminance signals when the first control signal is inputted as the switch control signal, the second luminance signals when the second is inputted, and the third luminance signals when the third control signal is inputted, as the selected signals.

12. A circuit as recited in claim 1, wherein said first ½-amplifying section includes a first ½-amplifier for ½-amplifying the selected signals from the selecting section in order to generate the first comb-filtered luminance signals, and a second ½-amplifier for ½-amplifying the fourth synchronized signals in order to generate the first comb-filtered chrominance signals.

13. A circuit as recited in claim 1, wherein said second comb-filtering section includes a frame comb-filter for comb-filtering the input composite video signals and frame delayed signals which delay the input composite video signals by one frame scanning period in order to generate fourth luminance signals and second chrominance signals, respectively.

a second synchronizing section for synchronizing the fourth luminance signals and the second chrominance signals at the predetermined time in order to generate fifth synchronized signals and sixth synchronized signals, respectively; and a second ½-amplifying section for ½-amplifying the fifth synchronized signals and the sixth synchronized signals in order to generate the second comb-filtered luminance signals and the second comb-filtered chrominance signals, respectively.

14. A circuit as recited in claim 13, wherein said frame comb-filter includes a frame delaying section for delaying the input composite video signals by one frame scanning period in order to generate frame delayed signals;

an adder for adding the input composite video signals to the frame delayed signals in order to generate the fourth luminance signals; and a subtracter for subtracting the frame delayed signals from the input composite video signals in order to generate the second chrominance signals.

15. A circuit as recited in claim 13, wherein said second synchronizing section including a first delaying section for delaying the fourth luminance signals in order to generate the fifth synchronized signals; and a second delaying section for delaying the second chrominance signals in order to generate the sixth synchronized signals.

16. A circuit as recited in claim 13, wherein said second ½-amplifying section includes a first ½-amplifier for ½-amplifying the fifth synchronized signals in order to generate the second comb-filtered luminance signals; and a second ½-amplifier for ½-amplifying the sixth synchronized signals in order to generate the second comb-filtered chrominance signals.

17. A circuit as recited in claim 1, wherein said motion detecting means includes a frame delaying section for delaying the input composite video signals by one frame scanning period in order to generate frame delayed signals;

a subtracter for subtracting the input composite video signals from the frame-delayed signals in order to generate subtracted signals;

an absolute value circuit for making the subtracted signals absolute in order to generate absolute signals; and a level convertor for converting levels of the absolute signals according to an amplifying rate in order to generate the motion sensing signals.

18. A circuit as recited in claim 17, wherein said motion sensing signals have levels between 0 and 1.

19. A circuit as recited in claim 1, wherein said mixing means includes a subtracter for subtracting the motion sensing signals from a maximum motion sensing signal in order to generate subtracted signals;

a multiplying section for multiplying the second comb-filtered luminance signals by the subtracted signals in order to generate first multiplied signals, the first comb-filtered luminance signals by the motion sensing signals in order to generate second multiplied signals, the first comb-filtered chrominance signals by the motion sensing signals in order to generate third multiplied signals, and the second comb-filtered chrominance signals by the subtracted signals in order to generate fourth multiplied signals; and an adding section for adding the first multiplied signals to the second multiplied signals in order to generate the motion adaptive luminance signals, and the third multiplied signals to the fourth multiplied signals in order to generate the motion adaptive chrominance signals.

20. A circuit as recited in claim 19, wherein said multiplying section includes a first multiplier for multiplying the second comb-filtered luminance signals by the subtracted signals in order to generate the first multiplied signals;

a second multiplier for multiplying the first comb-filtered luminance signals by the motion sensing signals in order to generate the second multiplied signals;

a third multiplier for multiplying the first comb-filtered chrominance signals by the motion sensing signals in order to generate the third multiplied signals; and a fourth multiplier for multiplying the second comb-filtered chrominance signals by the subtracted signals in order to generate the fourth multiplied signals.

21. A circuit as recited in claim 19, wherein said adding section includes a first adder for adding the first multiplied signals to the second multiplied signals in order to generate the motion adaptive luminance signals; and a second adder for adding the third multiplied signals to the fourth multiplied signals in order to generate the motion adaptive chrominance signals.

22. A circuit for separating a composite video signal into a chrominance signal and a luminance signal, said circuit comprising:

a motion detecting means for detecting a motion of an image which will be displayed into a television screen according to input composite video signals in order to generate motion sensing signals corresponding to a degree of the motion of the image;

a first comb-filtering means for adaptively comb-filtering the input composite video signals in a vertical direction according to degrees of correlations between three continuous horizontal scanning lines in order to separate the input composite video signals into first comb-filtered chrominance signals and first comb-filtered luminance signals;

a second-comb-filtering means for adaptively comb-filtering the input composite video signals in a time direction according to a correlation between frames in order to separate the input composite video signals into second comb-filtered chrominance signals and second comb-filtered luminance signals; and a mixing means for mixing the first comb-filtered chrominance signals with the second comb-filtered chrominance signals in order to generate motion adaptive chrominance signals, and the first comb-filtered luminance signals with the second comb-filtered luminance signals in order to generate motion adaptive luminance signals, in response to the motion sensing signals from the motion detecting means, wherein said first-comb filtering means includes a line comb-filter for comb-filtering the input composite video signals, 1 H-delayed signals which delay the input composite video signals by one horizontal scanning period, and 2 H-delayed signals which delay the input composite video signals by two horizontal scanning periods in order to generate first luminance signals, second luminance signals, third luminance signals, and first chrominance signals, respectively;

a first synchronizing section for synchronizing the first luminance signals, the second luminance signals, the third luminance signals, and the first chrominance signals at a predetermined time in order to generate first synchronized signals, second synchronized signals, third synchronized signals, fourth synchronized signals, respectively;

a selecting section for selecting one of the first synchronized signals, the second synchronized signals, and the third synchronized signals on a basis of the first and second luminance signals in order to generate the selected signals; and a first ½-amplifying section for ½-amplifying the selected signals in order to generate the first comb-filtered luminance signals, and the fourth synchronized signals in order to generate the first comb-filtered chrominance signals.

23. A circuit for separating a composite video signal into a chrominance signal and a luminance signal, said circuit comprising:

a motion detecting means for detecting a motion of an image which will be displayed into a television screen according to input composite video signals in order to generate motion sensing signals corresponding to a degree of the motion of the image;

a first comb-filtering means for adaptively comb-filtering the input composite video signals in a vertical direction according to degrees of correlations between three continuous horizontal scanning lines in order to separate the input composite video signals into first comb-filtered chrominance signals and the first comb-filtered luminance signals;

a second-comb-filtering means for adaptively comb-filtering the input composite video signals in a time direction according to a correlation between frames in order to separate the input composite video signals into second comb-filtered chrominance signals and second comb-filtered luminance signals; and a mixing means for mixing the first comb-filtered chrominance signals with the second comb-filtered chrominance signals in order to generate motion adaptive chrominance signals, and the first comb-filtered luminance signals with the second comb-filtered luminance signals in order to generate motion adaptive luminance signals, in response to the motion sensing signals from the motion detecting means, wherein said second comb-filtering means includes a frame comb-filter for comb-filtering the input composite video signals and frame delayed signals which delay the input composite video signals by one frame scanning period in order to generate luminance signals and chrominance signals, respectively;

a synchronizing section for synchronizing the luminance signals and the chrominance signals at a predetermined time in order to generate first synchronized signals and second synchronized signals, respectively; and a ½-amplifying section for ½-amplifying the first synchronized signals and the second synchronized signals in order to generate the first comb-filtered luminance signals and the second comb-filtered chrominance signals, respectively.

24. A circuit as recited in claim 22, wherein said mixing means includes a subtracter for subtracting the motion sensing signals from a maximum motion sensing signal in order to generate subtracted signals;

a multiplying section for multiplying the second comb-filtered luminance signals by the subtracted signals in order to generate first multiplied signals, the first comb-filtered luminance signals by the motion sensing signals in order to generate second multiplied signals, the first comb-filtered chrominance signals by the motion sensing signals in order to generate third multiplied signals, and the second comb-filtered chrominance signals by the subtracted signals in order to generate fourth multiplied signals; and an adding section for adding the first multiplied signals to the second multiplied signals in order to generate the motion adaptive luminance signals, and the third multiplied signals to the fourth multiplied signals in order to generate the motion adaptive chrominance signals.

25. A circuit as recited in claim 23, wherein said mixing means includes a subtracter for subtracting the motion sensing signals from a maximum motion sensing signal in order to generate subtracted signals;

a multiplying section for multiplying the second comb-filtered luminance signals by the subtracted signals in order to generate first multiplied signals, the first comb-filtered luminance signals by the motion sensing signals in order to generate second multiplied signals, the first comb-filtered chrominance signals by the motion sensing signals in order to generate third multiplied signals, and the second comb-filtered chrominance signals by the subtracted signals in order to generate fourth multiplied signals; and an adding section for adding the first multiplied signals to the second multiplied signals in order to generate the motion adaptive luminance signals, and the third multiplied signals to the fourth multiplied signals in order to generate the motion adaptive chrominance signals.

* * * * *